(No Model.)
E. S. RENWICK.
ART OF MANUFACTURING STARCH.
No. 263,958. Patented Sept. 5, 1882.
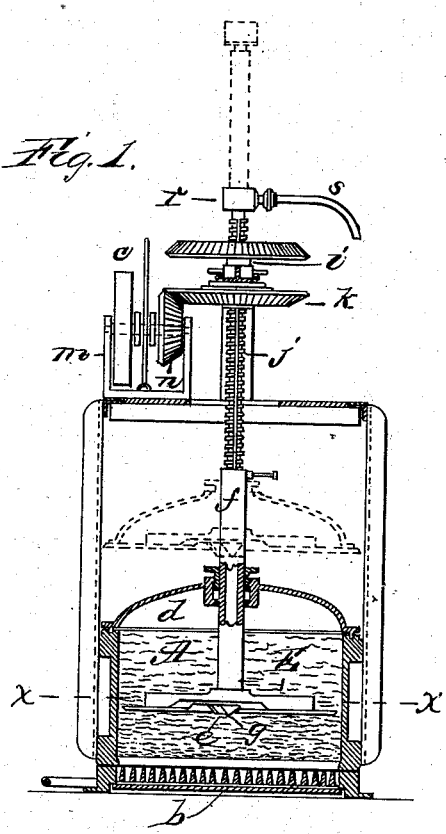
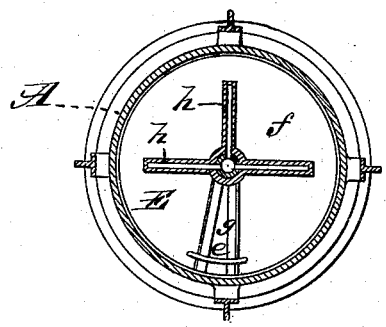
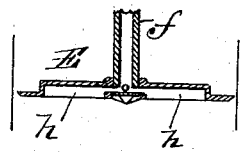
WITNESSES:
INVENTOR
Edward Sabine Renwick

UNITED STATES PATENT OFFICE.

EDWARD S. RENWICK, OF MILLBURN, NEW JERSEY.

ART OF MANUFACTURING STARCH.

SPECIFICATION forming part of Letters Patent No. 263,958, dated September 5, 1882.

Application filed July 11, 1882. (No model.)

*To all whom it may concern:*

Be it known that I, EDWARD SABINE RENWICK, of Millburn, in the county of Essex and State of New Jersey, have made an invention of certain new and useful Improvements in the Art of Manufacturing Starch, and of a new article of manufacture produced thereby; and I do hereby declare that the following, in connection with the accompanying drawings, is a full, clear, and exact description and specification of the same.

In the manufacture of starch as usually practiced a considerable loss of the material of the grain is experienced from the matter carried as waste from the starch-depositories, whether vats or planes, by the watery liquor from which starch has been deposited. This lost material comprises a large quantity of nitrogenous matter which is valuable for feed. Previous to my invention the attempt has been made to save more or less of this waste matter by subjecting the spent starch-liquor from the starch-depositories to a separating operation by means of sieves (either revolving or vibrating) clothed with fine bolting-cloth; but, so far as I have been able to ascertain, this separating operation has proved a practical failure, because of the slimy character of the material, which speedily clogs the meshes of the bolting-cloth and renders the separators temporarily inoperative.

The object of the present invention is to save the said fine or slimy waste material, and to put it in a condition in which it constitutes a valuable feed for animals; and the invention is based upon the discovery that the waste material may be recovered in whole or in part from the spent starch-liquor in which it is contained by filtering the said liquor through the coarser husky matter of the grain itself, thereby incorporating the said coarse husky matter and the fine or slimy material in a single product.

In order that my invention may be fully understood, I have represented in the accompanying drawings the filtering apparatus which I deem best fitted for practicing my improvements in the art; and I will proceed to describe my process as practiced with the same, and the new product which constitutes a part of my invention.

In the accompanying drawings, Figure 1 represents a vertical section, with certain parts in elevation, of the filter used by me. Fig. 2 represents a horizontal section of the same at the line *x x* of Fig. 1, and Fig. 3 represents a vertical section of the cutter-plate or parer.

The grain from which the starch is to be made—Indian corn, for example—is steeped and is ground with water in the usual manner practiced in corn-starch factories. The ground watery mass is then subjected to sieve-separators of the usual construction, (either vibratory or revolving,) by means of which the starch-milk is separated from the coarser portions of the grain, which consist mainly of the ground husks or skins. As the above-described operations and the mechanism for performing them are well known in the art of manufacturing starch, a detailed description of them is unnecessary. The coarse matter of the grain, separated as above described, is by preference drained and pressed to remove the greater part of the water, and is charged (by preference in a damp condition) into the filter, hereinafter described, and constitutes the filter-bed. The starch-milk, either with or without a preliminary condensation, is conducted to depositories, which may be either vats or starch-planes of the usual construction, in or on which the starch is deposited, while the spent starch-liquor is permitted to run off.

The spent liquor from the condensing-vats (if they be used) and from the starch-depositories contains the fine or slimy waste matter which is to be recovered by filtration, and the further operation upon it is conducted as follows: A filtering apparatus such as is represented in the accompanying drawings is provided. The cylindrical chamber A of this apparatus is closed at the bottom by a strong grating, *b*, which supports a perforated plate upon which a piece of canvas or cloth is spread, so as to prevent the escape of the coarse grain matter employed as the filtering material. The head of the chamber A is closed by a removable cover, *d*, which can be bolted securely to the upper flange of the chamber. The chamber is fitted with the cutter-plate E, which is secured to a hollow piston-rod, *f*, and whose under side is fitted with an inclined knife, *g*, and with passages *h*, which connect with the bore of the piston-rod. The cutter-plate also is perforated with a throat or passage, e, for the material pared off by the knife. The piston-rod f traverses a stuffing-box in the removable cover d, and its upper part or shank, j, is screwed and is passed through a nut, i, which is arranged to turn in a strong bail made fast to the filter-cylinder. The bail also holds a beveled wheel, k, which engages with a beveled pinion, n, and the pinion is secured to a shaft which is mounted in bearings in a frame, m, and is provided with a belt-pulley, c, to which a driving-belt may be applied. The hub of the beveled wheel k fits the exterior of the screwed shank j, and is provided with a spline which fits a longitudinal groove of the said screwed shank. Hence when the beveled wheel k is turned by the belt the piston-rod and the cutter-plate E are caused to turn, and the cutter-plate while turning is screwed downward. The nut of the screw may be either turned by hand or by power to draw upward the cutter-plate in order to raise the filtering material. I prefer, however, to connect the nut i by beveled wheels (similar to those k n) with a shaft carrying a belt-pulley, to which a belt is applied, so that the nut can be revolved in the direction to screw the cutter-plate upward. If it be so revolved while the beveled wheels k n are operating to turn the screw-shank downward, but at a slower speed than the beveled wheel k turns, the downward movement of the cutter-plate will be slower than the pitch of its screwed piston-rod shank. Hence the progressive downward movement of the cutter-plate or revolving parer E may be varied by varying the speed of revolution of the nut. When the beveled wheels k n are stationary the revolution of the nut raises the cutter-plate without turning it. The upper end of the piston-rod f is fitted with a swiveling hollow head, r, with which a flexible entry pipe or hose, s, is connected, and this hose is either connected with an elevated tank or with a force-pump for the forcing of the spent starch-liquor into the filter.

In practicing my process the cylindrical filter-chamber, when the cover d and cutter-plate or parer E are raised, is charged with the coarse matter of the grain obtained by the first separating operation, which coarse material is used preferably in a damp state, although it may be previously dried by the action of the heat and a current of air. The said coarse matter is pressed sufficiently in the filter-chamber to obstruct the free flow of the spent starch-liquor, but not to prevent it. The cover of the filtering-chamber is secured in place with the parer or cutter-plate E above the charge or bed of filtering material. The spent starch-liquor is then introduced on top of the mass of coarse material by means of the entry-pipe s, and the revolving parer E is caused to revolve by a belt applied to the pulley c. As the spent liquor passes under pressure through the coarse material of the grain the larger part of the slimy or solid matter is retained by the coarse material, while the spent water escapes from the filter. During the filtering operation the revolving parer E is caused to revolve by power and is screwed progressively downward, so as to pare off the upper surface of the filtering-bed as it becomes charged with slimy matter, to raise the parings, and to form a clean filtering-surface.

I prefer to conduct the operation in such manner that about as much spent starch-liquor is passed through the filter-bed of coarse grain matter as was obtained from the grain producing said coarse matter, so that the product in the filter contains a compound of coarse matter of the grain with the fine or nitrogenous matter which escapes from the starch-depositories, or with so much thereof as is separated from the spent starch-liquor by the filtration.

The compound product obtained in the filter is my new article of manufacture. It may be removed from the filter upon opening the head thereof and raising the parer, and is by preference pressed and dried before disposing of it, although it may be directly fed to animals.

The pressing and drying may be effected by the usual means employed in starch-works to dry the coarse material from the first separators, or by any other means that are suitable for the purpose. It may also be mixed with other feed materials, as deemed best.

It is not essential to my product that it should contain exactly the quantities of coarse matter and fine or slimy material obtained from the same grain, as it may contain more or less of the latter, according to the quantity of spent starch-liquor which is run through a single charge of the filtering matter. When the starch-milk is concentrated before the starch is collected upon or in the starch-depositories (planes or vats) the spent starch-liquor from the concentrating-vats is submitted to the filtering operation, and in such case the concentrated starch may be treated with alkali in the usual manner, in which case (unless the alkali in the spent liquor from the depositories is neutralized by an acid previous to filtration) the material recovered from the alkaline spent starch-liquor is not suitable for feed, and the spent alkaline starch-liquor should not be filtered directly through the coarse material of grain. The alkaline spent starch-liquor may, however, have its alkali neutralized by either sulphuric acid or muriatic acid, in which case its deleterious quality for feed is destroyed, and it may then be filtered, as previously described.

It is not essential to my invention that the same coarse grain matter which is obtained from the grain of which the starch is made should be used as the filtering material for the spent starch-liquor, as other coarse grain material may be used for the purpose. Thus the bran or offal obtained in grinding grain for flour or meal may be used as the filtering material and as the coarse ingredient for my new article of manufacture.

When the coarse grain matter or material obtained in the separating operation of the starch manufacture or otherwise is charged into the filter in a dry condition. I prefer to pass clear water through the mass in the filter before admitting the spent starch-liquor, so as to dampen the filter-bed. The height of the tank with which the entry-pipe $s$ of the filter connects should be sufficient to force the liquid through the filter. When a sufficient height of entry-pipe cannot be obtained for this purpose the spent starch-liquor may be forced through the filtering grain material by means of a force-pump of the usual construction.

I claim as my invention—

1. The improvement in the art of manufacturing starch, consisting of the process, substantially as before set forth, of recovering the fine or slimy matter from spent starch-liquor by filtering said liquor through the husky matter of grain.

2. The improvement in the art of manufacturing starch, consisting, substantially as before set forth, of the separation of the starch-milk from the husky matter of the grain by sieving the mixture, the separation of the starch from the starch-milk by deposition, and the filtration of the spent starch-liquor through the husky matter of grain, so as to recover fine or slimy material therefrom.

3. The new article of manufacture, substantially as before set forth, consisting of the compound of the husky matter of grain with the fine matter of grain recovered from spent starch-liquor by the filtration of said liquor through said husky matter.

In witness whereof I have hereto set my hand this 10th day of July, 1882.

EDWARD SABINE RENWICK.

Witnesses:
G. M. BARRETTO,
J. E. WARNER.